United States Patent
Hasebe et al.

(10) Patent No.: US 7,457,383 B2
(45) Date of Patent: Nov. 25, 2008

(54) RECEIVING LSI DEVICE AND RECEIVER USING THE SAME

(75) Inventors: Shinichi Hasebe, Saitama-ken (JP); Masahiro Abe, Tokyo (JP)

(73) Assignee: Kabushiki Kaish Toshiba, Tokyo (JP)

( * ) Notice: Subject to any disclaimer, the term of this patent is extended or adjusted under 35 U.S.C. 154(b) by 615 days.

(21) Appl. No.: 11/159,338

(22) Filed: Jun. 23, 2005

(65) Prior Publication Data

US 2005/0286658 A1    Dec. 29, 2005

(30) Foreign Application Priority Data

Jun. 24, 2004    (JP) ............................. 2004-185934

(51) Int. Cl.
*H04B 7/10*    (2006.01)
*H04L 1/02*    (2006.01)

(52) U.S. Cl. ..................... 375/347; 375/267; 375/224

(58) Field of Classification Search ................ 375/259, 375/267, 347, 349, 224; 455/226.1
See application file for complete search history.

(56) References Cited

U.S. PATENT DOCUMENTS

| | | | | |
|---|---|---|---|---|
| 5,530,725 A | * | 6/1996 | Koch ........................... | 375/347 |
| 5,566,364 A | * | 10/1996 | Mizoguchi et al. .......... | 455/132 |
| 5,781,592 A | * | 7/1998 | Masuda ....................... | 375/347 |
| 5,983,086 A | * | 11/1999 | Tsukuda ...................... | 455/132 |
| 7,024,168 B1 | * | 4/2006 | Gustafsson et al. .......... | 455/135 |
| 7,123,667 B2 | * | 10/2006 | Nagayasu .................... | 375/316 |
| 2004/0125741 A1 | * | 7/2004 | Demoulin et al. ............ | 370/208 |

FOREIGN PATENT DOCUMENTS

| | | |
|---|---|---|
| CN | 1373951 A | 10/2002 |
| GB | 2 353 673 A | 2/2001 |
| JP | 2003-283413 | 10/2003 |

* cited by examiner

*Primary Examiner*—Jean B Corrielus
(74) *Attorney, Agent, or Firm*—Oblon, Spivak, McClelland, Maier & Neustadt, P.C.

(57) ABSTRACT

A receiving large scale integrated circuit (LSI) device, including a demodulator which includes two signal processing circuits to demodulate two diversity signals to form a demodulated signal, a decoder which decodes the demodulated signal in accordance with an error correcting code to form a decoded signal, a receiving quality judgment circuit which codes the decoded signal to form a re-coded signal as a reference signal, compares the demodulated signal with the reference signal to obtain an error rate of the two diversity signals and supplies a judgment signal depending on the error rate, and a control circuit which selects one of the two signal processing circuits or both two signal processing circuits in response to the judgment signal of the receiving quality judgment circuit and stops supplying electric power or a clock signal to the one of the two processing circuits not selected by the control circuit.

20 Claims, 3 Drawing Sheets

RECEIVING LSI DEVICE AND RECEIVER USING THE SAME

CROSS-REFERENCE TO RELATED APPLICATION

This application is based upon and claims the benefit of priority from the prior Japanese Patent Application No. 2004-185934, filed on Jun. 24, 2004, the entire contents of which are incorporated herein by reference.

FIELD OF THE INVENTION

This invention generally relates to a receiving LSI device and a receiver using the same, and, in particular, to a receiving LSI device and a receiver applicable for a diversity system.

RELATED ART

A conventional receiving LSI (large scale integrated circuit) device for satellite broadcasting has an error correcting function using a Viterbi decoding method (disclosed in Japanese Unexamined Patent Publication 2-230822) or a Reed-Solomon code. Further, in order to improve receiving quality, two independent antennas are used for a diversity system in which signals received from the two antennas are decoded to restore original signals.

Recently, on the other hand, it is considered whether a diversity system should be adopted to improve the receiving quality of a receiving LSI device for a mobile device, such as a cellular phone and a portable TV receiver.

In order to adopt such a diversity system, however, a conventional receiving LSI device is required to operate two sets of analog-digital converters (ADCs) to carry out the sampling and quantizing of receiving signals in addition to operating two sets of code division multiplexers (CDMs). Even where a receiving status is so good that a single antenna can secure a receiving quality, it is necessary for all of those ADCs and CDMs to operate. Thus, they consume electric power significantly and are not installed in cellular phones or portable TV receivers.

SUMMARY OF THE INVENTION

Accordingly, the present invention provides a receiving LSI device to secure a high-receiving quality with reduction of electric power consumption and a receiver using the same.

One aspect of the present invention is directed to a receiving LSI device that comprises a demodulator which includes two signal processing circuits to demodulate two diversity signals and forms a demodulated signal, a decoder which decodes the demodulated signal in accordance with an error correcting code to form a decoded signal, a receiving quality judgment circuit which codes the decoded signal to form a re-coded signal as a reference signal, compares the demodulated signal with the reference signal to obtain an error rate of the two diversity signals and supplies a judgment signal depending on the error rate, and a control circuit which selects one of the two signal processing circuits or both two signal processing circuits in response to the judgment signal of the receiving quality judgment circuit and stops supplying electric power or a clock signal to another one of the two processing circuits not selected by the control circuit.

Another aspect of the present invention is directed to a receiver that comprises two sets of receiving circuits to receive diversity signals supplied through two sets of independent antennas, a demodulator to convert the signals into bit-train signals, a decoder to generate output signals by decoding the bit-train signals in accordance with an error correcting code, a coder to make the output signal coded again as a reference signal, a receiving quality judgment circuit which compares the reference signal with the two bit-train signals, obtains an error rate of the bit-train signals and judges receiving quality of the bit-train signals based on the error rate in order for a control circuit to select one of the diversity signals or both diversity signals based on the error rate and to stop supplying an electric power to one of the two sets of receiving circuits which is not selected by the control circuit.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawing, wherein.

EMBODIMENT

Figure 1:
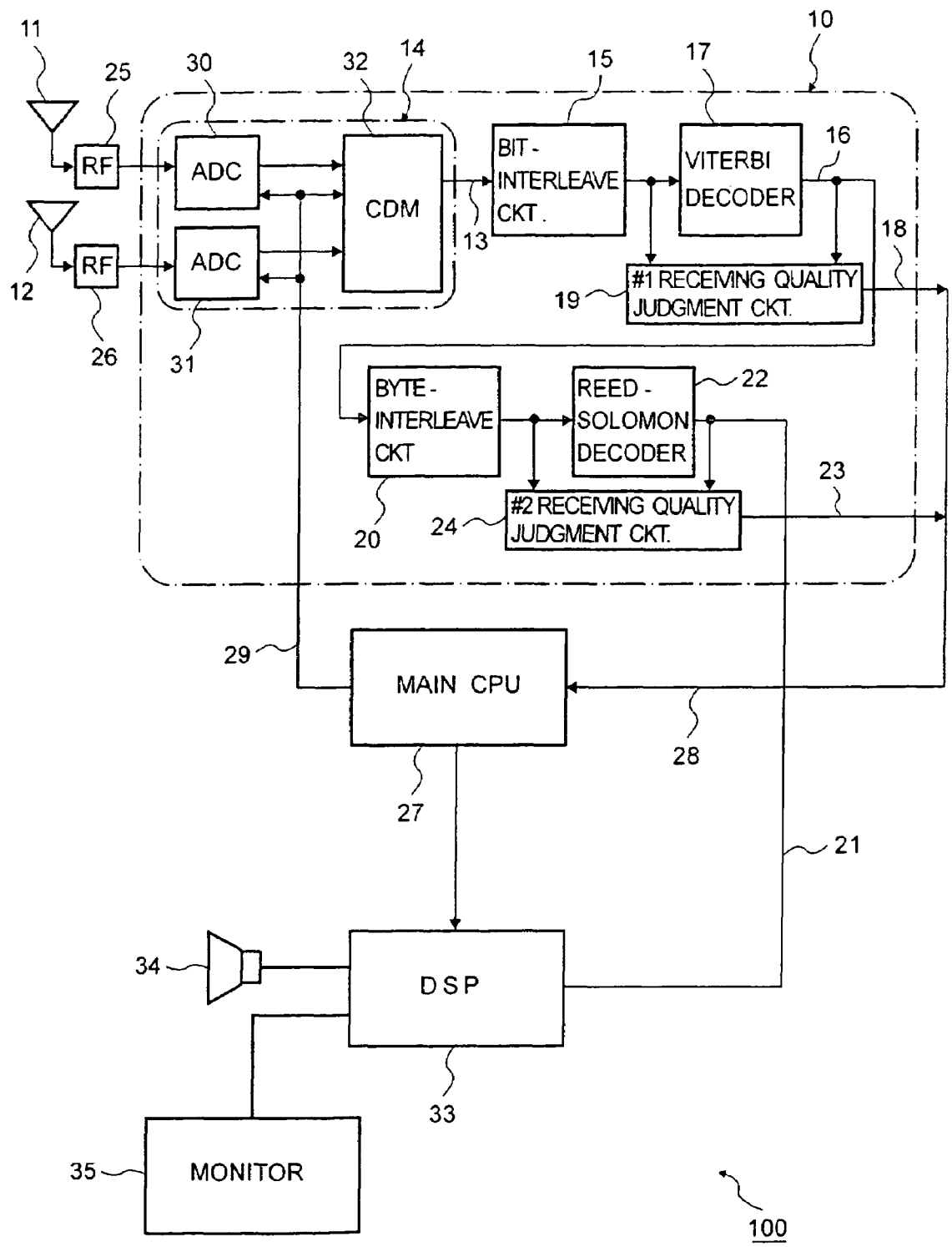
FIG. 1 is a block diagram of a receiver provided with a receiving LSI device according to an embodiment of the present invention.

With reference to FIG. 1, receiver 100 comprises receiving LSI device 10, two sets of independent antennas 11 and 12, RF circuits 25 and 26 connected to antennas 11 and 12, respectively, main central processor unit (CPU) 27, digital signal processor (DSP) 33, speaker 34 and video monitor 35.

Receiving signals provided through antennas 11 and 12 are amplified and rectified by RF circuits 25 and 26, respectively. Output signal of RF circuits 25 and 26 are supplied to receiving LSI device 10.

Receiving LSI device 10 comprises demodulator 14, bit-interleave circuit 15, Viterbi decoder 17, receiving quality judgment circuit 19, byte-interleave circuit 20, Reed-Solomon decoder 22 and receiving quality judgment circuit 24.

Demodulator 14 demodulates two diversity signals of RF circuits 25 and 26 to make bit-train demodulated signal 13. Demodulator 14 has two signal processing circuits to process the two diversity signals, such as analog-digital-converters (ADCs) 30 and 31, respectively, and selective conversion circuit 32, such as a code division multiplexer (CDM).

ADCs 30 and 31 sample and quantize the diversity signals to convert the same into digital signals. CDM 32 makes bit-train demodulated signal 13 out of one of digital signals of ADCs 30 and 31 or both.

Demodulated signal 13 is provided to bit-interleave circuit 15. Since an original data signal has been subjected to the change of its bit order at the transmission as a part of measures taken for mitigating burst errors and sudden interruption, bit-interleave circuit 15 changes a bit order of demodulated signal 13 to restore the same to the bit order of the original. An output signal of bit-interleave circuit 15 is provided to Viterbi decoder 17 and first receiving quality judgment circuit 19.

Viterbi decoder 17 decodes the output signal of bit-interleave circuit 15 in accordance with a Viterbi decoding method to carry out an error correction of demodulated signal 13 and provides Viterbi decoded signal 16 to first receiving quality judgment circuit 19 and byte-interleave circuit 20.

First receiving quality judgment circuit 19 codes Viterbi decoded signal 16 again to form a reference signal, compares the same with the output signal of bit-interleave circuit 15, calculates an error rate of demodulated signal 13 and supplies judgment signal 18 indicative of such an error rate to main CPU 27.

Diversity receiving status, here, is relatively so good that an error rate of demodulated signal 13 can perfectly corrected by the Viterbi decoding method. In other words, Viterbi decoded signal 16 is corrected to the original data at the transmission (data before convolution coding).

First receiving quality judgment circuit 19 supplies an "OK" signal as judgment signal 18 when the error rate is "0%" or an "NG" signal as judgment signal 18 when the error rate is not "0%".

Since an original data signal has been subjected to the change of its byte order at the transmission as a part of measures taken for mitigating burst errors, byte-interleave circuit 20 changes a byte order of Viterbi decoded signal 16 to restore the same to the byte order of the original. An output signal of byte-interleave circuit 20 is provided to Reed-Solomon decoder 22 and second receiving quality judgment circuit 24.

Reed-Solomon decoder 22 decodes an output signal of byte-interleave circuit 20 to carry out an error correction of Viterbi decoded signal 16 and supplies output signal 21 to DSP 33.

Second receiving quality judgment circuit 24 codes output signal 21 again in accordance with a Reed-Solomon coding method as a reference signal, compares the output signal of byte-interleave circuit 20 with the reference signal, calculates an error rate of Viterbi decoded signal 16 and supplies judgment signal 23 indicative of such an error rate to main CPU 27.

Similar to the first receiving judgment signal, the error rate of Viterbi decoded signal 16, here, is relatively so good that the error rate can be perfectly corrected by Reed-Solomon decoder 22.

Second receiving quality judgment circuit 24 supplies an "OK" signal as judgment signal 18 when the error rate is "0%" or an "NG" signal as judgment signal 18 when the error rate is not "0%".

Main CPU 27 receives first and second judgment signals 18 and 23 through data bus 28 and supplies control signal 29 to ADCs 30 and 31 and CDM 32 based on judgment signals 18 and 23.

When CDM 32 receives receiving signals from antennas 11 and 12 through ADCs 30 and 31, respectively, and decodes the receiving signals while main CPU 27 receives the "OK" signal as both judgment signals 18 and 23, main CPU 27 provides CDM 32 with control signal 29 to select one of ADCs 30 and 31.

Main CPU 27 provides control signal 29 to turn off the non-selected one of ADCs 30 and 31 and a part of CDM 32. At the same time, main CPU 27 provides control signal 29 which instructs not to supply electric power to the non-selected one of ADCs 30 and 31 and a part of CDM 32.

When receiving status becomes bad and judgment signal 18 or 23 indicates the "NG", signals received from antennas 11 and 12 are selected under control of main CPU 27 for demodulator 14 to demodulate the receiving signals. Main CPU 27 sends control signal 29 to supply electric power to the circuits to which electric power has not been supplied.

When receiving status is extremely bad and judgment signal 18 or 23 is indicative of "NG" even though both antennas 11 and 12 are selected while RF circuits 25 and 26 and demodulator 14 are fully energized, main CPU 27 regards it as failure of receiving and carries out error processing.

Reed-Solomon decoded signal 21 of Reed-Solomon decoder 22 is subjected to a post-signal processing in DSP 33 and an output signal of DSP 33 is supplied to speaker 34 and video monitor 35.

Figure 2:
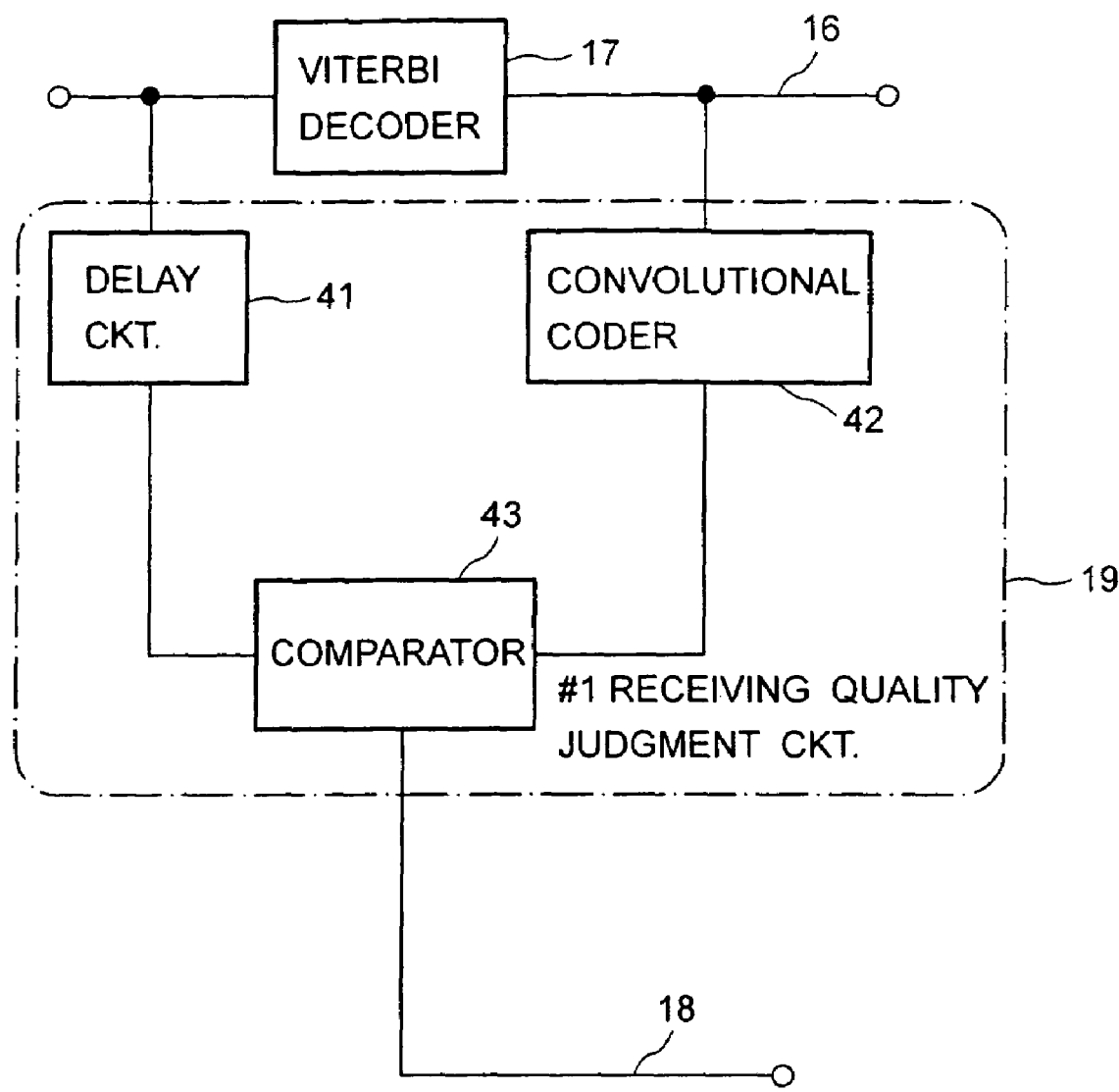
FIG. 2 is a block diagram of a first receiving quality judgment circuit of the receiving LSI device shown in FIG. 1.

As shown in a block diagram of FIG. 2, first receiving quality judgment circuit 19 is provided with delay circuit 41, convolutional coder 42 and comparator 43. Viterbi decoded signal 16 is coded again in convolutional coder 42 so that a reference signal is formed. A delay time at convolutional coder 42 and comparator 43 is compensated in delay circuit 41. The output signal of bit-interleave circuit 15 is compared with the reference signal in comparator 43 to generate first receiving judgment signal 18.

Figure 3:
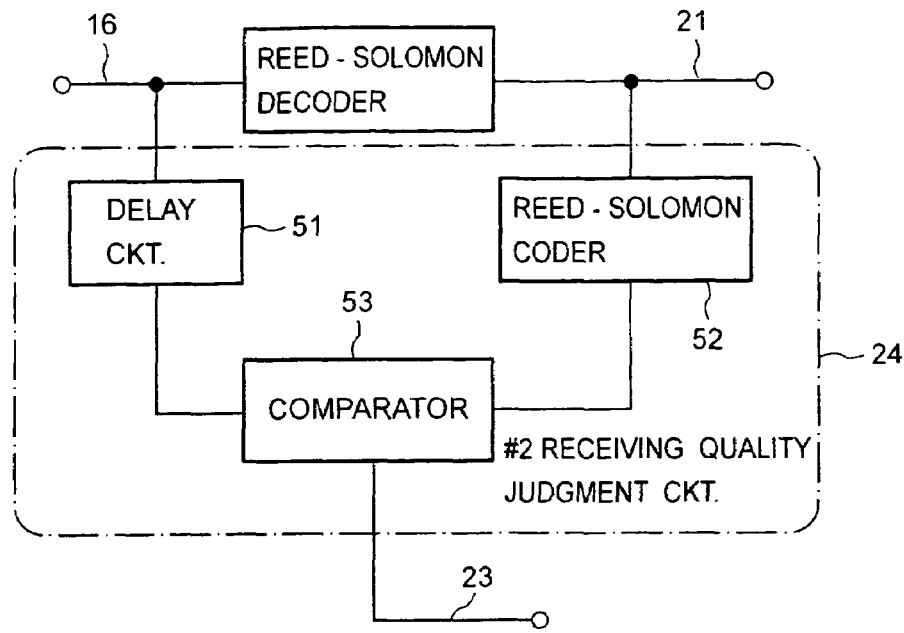
FIG. 3 is a block diagram of a second receiving quality judgment circuit of the receiving LSI device shown in FIG. 1.

A block diagram of second receiving quality judgment circuit 24 is shown in FIG. 3. Second receiving quality judgment circuit 24 is provided with delay circuit 51, Reed-Solomon coder 52 and comparator 53. Reed-Solomon decoded signal 16 is coded again in Reed-Solomon coder 52 so that a reference signal is formed. A delay time at Reed-Solomon coder 52 and comparator 53 is compensated in delay circuit 51. The output signal of byte-interleave circuit 16 is compared with the reference signal in comparator 53 to generate second receiving judgment signal 23.

Figure 4:
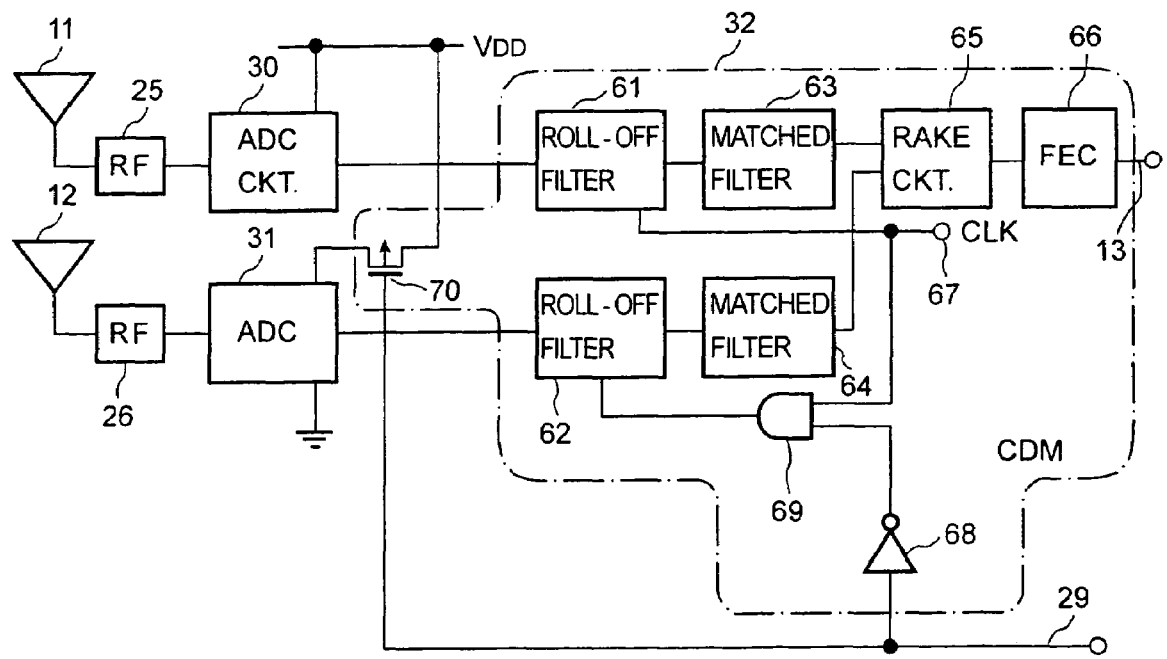
FIG. 4 is a block diagram of a CDM of the receiving LSI device shown in FIG. 1.

Referring now to FIG. 4, gate circuit 70 is shown in connection with ADCs 30 and 31 and CDM 32. Gate circuit 70 comprises a MOS gate, the source and drain electrodes of which are connected to power source VDD and ADC 31 and the gate electrode of which is supplied with control signal 29. Further, CDM 32 is provided with roll-off filters 61 and 62, matched filters 63 and 64, rake circuit 65, forward error correction (FEC) circuit 66, inverter 68 and AND gate 69.

When control signal 29 is "OK" (high level) in response to first and second receiving judgment signals 18 and 23, gate circuit 70 is turned off, so that source voltage VDD is no longer supplied to ADC 31. In addition, an output signal of inverter 68 becomes low in level and AND gate 69 is turned off, so that a clock signal applied to terminal 67 is no longer provided to roll-off filter 62. In short, when the receiving diversity signals are good enough, electric power consumption of demodulator 14 is remarkably reduced.

When the receiving diversity signals, however, are not sufficient, control signal 29 becomes "NG" (low level), gate circuit 70 is turned on, so that source voltage VDD is also supplied to ADC 31. Further, the output signal of inverter 68 becomes high in level and AND gate 69 is turned on, so that the clock signal applied to terminal 67 is provided to roll-off filter 62 as well.

According to the embodiment, since receiving signals can be received in accordance with judgment signals 18 and 23, high receiving quality can be ensured.

Further, since the supply of electric power to unused circuits in demodulator 14 is stopped, electric power consumption in receiving status can be significantly reduced.

Although judgment signals 18 and 23 are indicative of "OK" at the error rate of "0%" because receiving status is supposed to be relatively good in the embodiment, the present invention is not limited to such rate but also applicable to a receiver in which judgment signals 18 and 23 are indicative of "OK" when the error rate is equal to or less than a certain value.

Alternatively, judgment signals 18 and 23 are directly provided to CDM 32 so as to select one of receiving diversity signals from RF circuits 25 and 26.

Further, although the supply of electric power to unused circuits in demodulator 14 is stopped to save power consumption in the embodiment, the present invention is not limited to such purpose but also applicable to a receiver in which an inoperative state to save electric power consumption can be achieved by stopping the supply of a clock pulse to the unused circuits, for instance.

In addition, although a double error correction based on the Viterbi decoding method and the Reed-Solomon code is applied in the embodiment, the present invention is not limited to such double error correction methods but any error correction also can be basically used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What we claim is:

1. A receiving large scale integrated circuit (LSI) device, comprising:
   a demodulator which includes two signal processing circuits to demodulate two diversity signals to form a demodulated signal;
   a decoder which decodes the demodulated signal in accordance with an error correcting code to form a decoded signal;
   a receiving quality judgment circuit which codes the decoded signal to form a re-coded signal as a reference signal, compares the demodulated signal with the reference signal to obtain an error rate of the two diversity signals and supplies a judgment signal depending on the error rate; and
   a control circuit which selects one of the two signal processing circuits or both two signal processing circuits in response to the judgment signal of the receiving quality judgment circuit and stops supplying electric power or a clock signal to the one of the two processing circuits not selected by the control circuit.

2. The receiving LSI device according to claim 1, wherein the two signal processing circuits respectively include first and second analog-digital converters each coupled to respective one of the two diversity signals to sample and quantize said respective one of the two diversity signals to form first and second digital signals, respectively and the control circuit which selects one of the first and second analog-digital converters or both first and second analog-digital converters in response to the judgment signal of the receiving quality judgment circuit and stops supplying the electric power or the clock signal to the other one of the two analog-digital converters not selected by the control circuit.

3. The receiving LSI device according to claim 2, wherein the two signal processing circuits further collectively include a selective conversion circuit which selects one of the digital signals to form the demodulated signal, and the control circuit which selects one part of the selective conversion circuit or the entire selective conversion circuit in response to the judgment signal of the receiving quality judgment circuit and stops supplying the electric power or the clock signal to another part of the selective conversion circuit not selected by the control circuit.

4. The receiving LSI device according to claim 1, wherein the receiving quality judgment circuit outputs the judgment signal which is indicative of receiving quality of the two diversity signals in accordance with whether the error rate is greater than or equal to a predetermined value.

5. The receiving LSI device according to claim 4, wherein the receiving quality judgment circuit outputs the judgment signal which is indicative of receiving quality of the two diversity signals in accordance with the error rate of substantially 0% or more.

6. The receiving LSI device according to claim 4, wherein the control circuit selects one of the two signal processing circuits in response to the error rate being equal to the predetermined value or both two signal processing circuits in response to the error rate being greater than the predetermined value and stops supplying the electric power or the clock signal to the other one of the two processing circuits not selected by the control circuit.

7. A receiving large scale integrated circuit (LSI) devices comprising:
   a demodulator which includes two signal processing circuits to demodulate two diversity signals to form a demodulated signal;
   a bit-interleave circuit which changes a bit-order of the demodulated signal to restore an original-bit-order signal;
   a Viterbi decoder which decodes the original-bit-order signal in accordance with a Viterbi code to form a Viterbi decoded signal;
   a first receiving quality judgment circuit which codes the Viterbi decoded signal to form a first reference signal, compares the original-bit-order signal with the first reference signal to obtain a first error rate of the two diversity signals and supplies a first judgment signal depending on the error rate;
   a byte-interleave circuit which changes a byte-order of the Viterbi decoded signal to restore an original-byte-order signal;
   a Reed-Solomon decoder which decodes the original-byte-order signal in accordance with a Reed-Solomon code to form a Reed-Solomon decoded signal;
   a second receiving quality judgment circuit which codes the Reed-Solomon decoded signal to form a second reference signal, compares the original-byte-order signal with the second reference signal to obtain a second error rate of the two diversity signals and supplies a second judgment signal depending on an error rate of the Viterbi decoded signal; and
   a control circuit which selects one of the two signal processing circuits or both two signal processing circuits in response to the first and second judgment signals and stops supplying electric power or a clock signal to another one of the two processing circuits not selected by the control circuit.

8. The receiving LSI device according to claim 7, wherein the two signal processing circuits respectively include first and second analog-digital converters each coupled to respective one of the two diversity signals to sample and quantize said respective one of the two diversity signals to form first and second digital signals, respectively, and the control circuit which selects one of the first and second analog-digital converters or both first and second analog-digital converters in response to the first and second judgment signals and stops supplying the electric power or the clock signal to the other one of the two analog-digital converters not selected by the control circuit.

9. The receiving LSI device according to claim 8, wherein the signal processing circuits further includes a selective conversion circuit which selects one of the digital signals to form the demodulated signal, and the control circuit which selects one part of the selective conversion circuit or the entire selective conversion circuit in response to the first and second judgment signals and stops supplying the electric power or the clock signal to another part of the selective conversion circuit not selected by the control circuit.

10. The receiving LSI device according to claim 7, wherein the first and second receiving quality judgment circuits output the first and second judgment signals which are indicative of receiving quality of the two diversity signals in accordance with whether the error rate is greater than or equal to a predetermined value.

11. The receiving LSI device according to claim 10, wherein the first and second receiving quality judgment circuits output the first and second judgment signals which are indicative of receiving quality of the two diversity signals in accordance with the error rate of substantially 0% or more.

12. The receiving LSI device according to claim 10, wherein the control circuit selects one of the two signal processing circuits in response to the error rate being equal to the predetermined value or both two signal processing circuits in response to the error rate being greater than the predetermined value and stops supplying the electric power or the clock signal to the other one of the two processing circuits not selected by the control circuit.

13. The receiving LSI device according to claim 10, wherein the control circuit selects one of the two signal processing circuits in response to the error rate of substantially 0% or both two signal processing circuits in response to the error rate of substantially more than 0% and stops supplying the electric power or the clock signal to the other one of the two processing circuits not selected by the control circuit.

14. A receivers comprising:
two antennas configured to receive two diversity signals;
two radio frequency (RF) circuits each configured to amplify respective one of the two diversity signals;
a receiving large scale integrated circuit (LSI) device having,
a demodulator which includes two signal processing circuits to respectively demodulate the two diversity signals amplified by the two RF circuits to form a demodulated signal,
a decoder which decodes the demodulated signal in accordance with an error correcting code to form a decoded signal,
a receiving quality judgment circuit which codes the decoded signal to form a re-coded signal as a reference signal, compares the demodulated signal with the reference signal to obtain an error rate of the two diversity signals and supplies a judgment signal depending on the error rate, and
a control circuit which selects one of the two signal processing circuits or both two signal processing circuits in response to the judgment signal of the receiving quality judgment circuit and stops supplying electric power or a clock signal to another one of the two processing circuits not selected by the control circuit; and
a central processor to supply the control circuit with a control signal based on the judgment signal of the receiving-quality-judgment circuit.

15. The receiver according to claim 14, wherein
the decoder includes a bit-interleave circuit which changes a bit-order of the demodulated signal to restore an original-bit-order signal, and
the receiving quality judgment circuit comprises
a Viterbi decoder which decodes the original-bit-order signal in accordance with a Viterbi code to form a Viterbi decoded signal,
a first receiving quality judgment circuit which codes the Viterbi decoded signal to form a first reference signal, compares the original-bit-order signal with the first reference signal to obtain a first error rate of the two diversity signals and supplies a first judgment signal depending on the error rate,
a byte-interleave circuit which changes a byte-order of the Viterbi decoded signal to restore the original-byte-order signal,
a Reed-Solomon decoder which decodes the original-byte-order signal in accordance with a Reed-Solomon code to form a Reed-Solomon decoded signal, and
a second receiving quality judgment circuit which codes the Reed-Solomon decoded signal to form a second reference signal, compares the original-byte-order signal with the second reference signal to obtain a second error rate of the two diversity signals and supplies a second judgment signal depending on an error rate of the Viterbi decoded signal.

16. The receiver according to claim 14, wherein the signal processing circuits includes first and second analog-digital converters each coupled to respective one of the two diversity signals to sample and quantize said respective one of the two diversity signals to form first and second digital signals, and the control circuit which selects one of the first and second analog-digital converters or both first and second analog-digital converters in response to the first and second judgment signals and stops supplying the electric power or the clock signal to the other one of the two analog-digital converters not selected by the control circuit.

17. The receiver according to claim 16, wherein the signal processing circuits further includes a selective conversion circuit which selects one of the digital signals to form the demodulated signal, and the control circuit which selects one part of the selective conversion circuit or the entire selective conversion circuit in response to the first and second judgment signals and stops supplying the electric power or the clock signal to another part of the selective conversion circuit not selected by the control circuit.

18. The receiver according to claim 14, wherein the first and second receiving quality judgment circuits respectively output first and second judgment signals which are indicative of receiving quality of the two diversity signals in accordance with whether the error rate is greater than or equal to a predetermined value.

19. The receiver according to claim 18, wherein the first and second receiving quality judgment circuits output the first and second judgment signals which are indicative of receiving quality of the two diversity signals in accordance with the error rate of substantially 0% or more.

20. The receiver according to claim 18, wherein the control circuit selects one of the two signal processing circuits in response to the error rate being equal to the predetermined value or both two signal processing circuits in response to the error rate of being greater than the predetermined value and stops supplying the electric power or the clock signal to the other one of the two processing circuits not selected by the control circuit.

* * * * *

UNITED STATES PATENT AND TRADEMARK OFFICE
CERTIFICATE OF CORRECTION

PATENT NO. : 7,457,383 B2
APPLICATION NO. : 11/159338
DATED : November 25, 2008
INVENTOR(S) : Hasebe et al.

It is certified that error appears in the above-identified patent and that said Letters Patent is hereby corrected as shown below:

On the title page, Item 73, Assignee should read:

--(73) Assignee: Kabushiki Kaisha Toshiba, Tokyo (JP)--

Signed and Sealed this

Twentieth Day of January, 2009

JON W. DUDAS
*Director of the United States Patent and Trademark Office*